(12) United States Patent
DeLamielleure et al.

(10) Patent No.: US 10,800,698 B2
(45) Date of Patent: Oct. 13, 2020

(54) METHODS FOR PREVENTING BLISTERS IN LAMINATED GLASS ARTICLES AND LAMINATED GLASS ARTICLES FORMED THEREFROM

(71) Applicant: CORNING INCORPORATED, Corning, NY (US)

(72) Inventors: Megan Aurora DeLamielleure, Corning, NY (US); Irene Mona Peterson, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 333 days.

(21) Appl. No.: 15/505,178

(22) PCT Filed: Aug. 14, 2015

(86) PCT No.: PCT/US2015/045224
§ 371 (c)(1),
(2) Date: Feb. 20, 2017

(87) PCT Pub. No.: WO2016/028625
PCT Pub. Date: Feb. 25, 2016

(65) Prior Publication Data
US 2017/0267570 A1    Sep. 21, 2017

Related U.S. Application Data

(60) Provisional application No. 62/040,028, filed on Aug. 21, 2014.

(51) Int. Cl.
*C03C 21/00* (2006.01)
*C03B 17/02* (2006.01)
(Continued)

(52) U.S. Cl.
CPC .............. *C03C 1/004* (2013.01); *B32B 17/06* (2013.01); *C03B 17/02* (2013.01); *C03B 17/064* (2013.01);
(Continued)

(58) Field of Classification Search
None
See application file for complete search history.

(56) References Cited

U.S. PATENT DOCUMENTS

| 3,673,049 A | 6/1972 | Giffen et al. |
| 3,737,294 A | 6/1973 | Dumbaugh |

(Continued)

FOREIGN PATENT DOCUMENTS

| WO | WO-2013016157 A1 * | 1/2013 | ............. C03C 3/091 |
| WO | 2013130665 | 9/2013 | |

(Continued)

OTHER PUBLICATIONS

English Translation of CN201580044986.5 Office Action dated Apr. 16, 2019; 21 Pages; Chinese Patent Office.
Deubener et al., "Nucleation and crystallization kinetics on float glass surfaces" Glastech. Ber., 65, pp. 256-266 (1992).
Kawazoe et al; "ESR Studies of Radiation-Induced Tin Centers in Oxide Glasses"; Journal De Physique Colloque 43 (C9) pp. 155-158 (1982).

(Continued)

*Primary Examiner* — Lisa L Herring
(74) *Attorney, Agent, or Firm* — Michael A. Hood; Svetlana Z. Short

(57) ABSTRACT

A method for forming a laminated glass article may include flowing a molten first glass composition having a first $R_2O$ concentration and a first fining agent with a first fining agent concentration. The method may also include flowing a molten second glass composition having a second $R_2O$ concentration less than the first $R_2O$ concentration of the first glass composition and a second fining agent with a second fining agent concentration that is greater than or equal to the first fining agent concentration of the first glass composition. The molten first glass composition may be (Continued)

contacted with the molten second glass composition to form an interface between the molten first glass composition and the molten second glass composition.

11 Claims, 4 Drawing Sheets

(51) Int. Cl.
| | |
|---|---|
| *C03B 17/06* | (2006.01) |
| *C03C 1/00* | (2006.01) |
| *C03C 3/091* | (2006.01) |
| *B32B 17/06* | (2006.01) |
| *C03C 3/093* | (2006.01) |
| *C03C 3/087* | (2006.01) |
| *C03C 3/085* | (2006.01) |

(52) U.S. Cl.
CPC .............. *C03C 3/085* (2013.01); *C03C 3/087* (2013.01); *C03C 3/091* (2013.01); *C03C 3/093* (2013.01); *C03C 21/001* (2013.01); *Y02P 40/57* (2015.11)

(56) References Cited

U.S. PATENT DOCUMENTS

| | | | |
|---|---|---|---|
| 3,746,526 | A | 7/1973 | Giffon |
| 3,849,097 | A | 11/1974 | Giffen |
| 3,931,438 | A | 1/1976 | Beall et al. |
| 4,023,953 | A | 5/1977 | Megles, Jr. et al. |
| 4,102,664 | A | 7/1978 | Dumbaugh |
| 4,214,886 | A | 7/1980 | Shay et al. |
| 5,017,433 | A | 5/1991 | Chevreux et al. |
| 5,342,426 | A | 8/1994 | Dumbaugh |
| 5,559,060 | A | 9/1996 | Dumbaugh |
| 7,201,965 | B2 | 1/2007 | Gulati |
| 7,514,149 | B2 | 4/2009 | Bocko et al. |
| 8,007,913 | B2 | 8/2011 | Coppola et al. |
| 8,168,552 | B2 | 5/2012 | Joubaud et al. |
| 2006/0291528 | A1* | 12/2006 | Kiefer ..................... C03B 5/021 373/147 |
| 2008/0127679 | A1 | 6/2008 | Nishizawa et al. |
| 2012/0202010 | A1 | 8/2012 | Uchida |
| 2017/0174564 | A1 | 6/2017 | Cleary et al. |

FOREIGN PATENT DOCUMENTS

| | | |
|---|---|---|
| WO | 2013130668 | 9/2013 |
| WO | 2013130700 | 9/2013 |
| WO | 2013130718 | 9/2013 |
| WO | 2015016935 | 2/2015 |
| WO | 2015023561 | 2/2015 |
| WO | 2015077109 | 5/2015 |
| WO | 2015138660 | 9/2015 |
| WO | WO-2015148618 A1 * | 10/2015 ............. C03C 17/02 |

OTHER PUBLICATIONS

Kumar et al., "$Sn^{2+}$-$Sn^{4+}$ and $Fe^{2+}$-$Fe^{3+}$ redox interaction in 30 $Na_2O$-70 $SiO_2$ glass" Glastech. Ber., 64, pp. 106-108 (1991).
Nomura, "Conversion Electron Mossbauer Spectroscopy" Mossbauer spectroscopy in Material Science, (Kluwer Academic Publishers, the Netherlands, 1999), pp. 63-78.
Pantano and Bojan, "Tin profiles in the bottom surface of float glass: manufacturing and heat treatment effects" Fundamentals of Glass Science and Technology, vol. 23, pp. 285-290 (1993).
Pilkington; "Review Lecture. The Float Glass Process"; Proceedings of the Royal Societ of London Series A, Mathematical and Physical Sciences, 314 (1516) pp. 1-25 (1969).
Sieger; "Chemical Characteristics of Float Glass Surfaces"; Journal of Non-Crystalline Solids, vol. 19. pp. 213-220 (1975).
Takeda et al; "Formation of Nanometer-Sized $SNO_2$ Colloids and Change in SN-Depth Concentration Profile in Float Glass Induced by Oxygen Diffusion From Atmosphere at Temperatures Above TG"; Journal of Non-Crystalline Solids, vol. 281, pp. 1-5 (2001).
Takeda et al; "Precipitation of Nanometer-Sized $SNO_2$ Crystals and Sn Depth Profile in Heat-Treated Float Glass"; Journal of Non-Crystalline Solids, 311, pp. 273-280 (2002).
Townsend et al; "Comparisions of Tin Depth Profile Analysis in Float Glass"; Journal of Non-Crystalline Solids; 223, 73-85 (1998).
Sidorchuk and Chertov, "Formation of the structure of Compositions of $SnO_2$-$SiO_2$ system in hydrothermal conditions" Sov. J. Inorg. Mater. , vol. 22, 1929-1935 (1986).
Williams et al., "Oxidation states of tin and iron inclear and tinted float glass by Mossbauer spectroscopy", Fundamentals of Glass Science and Technology. pp. 127-134 (1997).
Williams et al; "Characterization of Tin At the Surface of Float Glass"; Journal of Noncrystalline Solids; 242, 183-188 (1998).
Williams et al; "Tin Oxidation State, Depth Profiles of $SN^{2+}$ and $SN^{4+}$ and Oxygen Diffusivity in Float Glass by Mossbauer Spectroscopy"; Journal of Non-Crystalline Solids; 211, 164-172 (1997).
Takeda "Paper3. Effect of Oxygen Diffusion from the Atmosphere on Sn Depth Profile of Float Glass at Temperatures Above Tg",dated 2003, pp. 1-5, Japan, available at www.agc.com/english/rd/library/03/03.html.
Notification of Transmittal of the International Search Report and Written Opinion of the International Searching Authority, or the Declaration, dated Aug. 14 2015, pp. 1-12, International Application No. PCT/US2015/045224 European Patent Office, The Netherlands.
Japanese Patent Application No. 2017510353; English Translation of the Office Action dated Aug. 20, 2019, Japan Patent Office; 11 Pgs.
Indian Patent Application No. 201717005212; First Examination Report dated Oct. 10, 2019; India Patent Office; 6 Pgs.
Taiwanese Patent Application No. 108113759; English Translation of the Office Action and Search Report dated Sep. 18, 2019; Taiwan Patent Office; 3 Pgs.

* cited by examiner

METHODS FOR PREVENTING BLISTERS IN LAMINATED GLASS ARTICLES AND LAMINATED GLASS ARTICLES FORMED THEREFROM

BACKGROUND

This application claims the benefit of priority to International Application No. PCT/US2015/045224, filed on Aug. 14, 2015, which claims the benefit of priority to U.S. Provisional Application No. 62/040028, filed on Aug. 21, 2014, the content of each of which is incorporated herein by reference in its entirety.

Field

The present specification generally relates to laminated glass articles and, more specifically, to methods for making laminated glass articles with reduced blister defects.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

Various processes may be used to strengthen glass articles, including chemical tempering, thermal tempering, and lamination. A glass article strengthened by lamination is formed from at least two glass compositions which have different coefficients of thermal expansion. These glass compositions are brought into contact with one another in a molten state to form the glass article and fuse or laminate the glass compositions together. As the glass compositions cool, the difference in the coefficients of thermal expansion cause compressive stresses to develop in at least one of the layers of glass, thereby strengthening the glass article. Lamination processes can also be used to impart or enhance other properties of laminated glass articles, including physical, optical, and chemical properties While lamination is effective to increase or enhance the properties of the resultant glass article, defects may be created in the glass during the lamination process. One common defect is the formation of blisters or bubbles at the interface between the two glass compositions. In cases where these defects are significant, the glass article may be discarded, thereby reducing manufacturing efficiency and increasing production costs.

Accordingly, a need exists for alternative methods for forming laminated glass articles which mitigate the formation of defects in the glass article.

SUMMARY

According to one embodiment, a method for forming a laminated glass article may include flowing a molten first glass composition, the first glass composition comprising a first $R_2O$ concentration and a first fining agent with a first fining agent concentration. R may be an element from Group I of the periodic table. The method may also include flowing a molten second glass composition, the second glass composition comprising a second $R_2O$ concentration less than the first $R_2O$ concentration of the first glass composition and a second fining agent with a second fining agent concentration that is greater than or equal to the first fining agent concentration of the first glass composition. The molten first glass composition may be contacted with the molten second glass composition to form an interface between the molten first glass composition and the molten second glass composition.

In another embodiment, a method for forming a laminated glass article may include flowing a molten first glass composition, the first glass composition comprising a first $R_2O$ concentration and $SnO_2$ at a first $SnO_2$ concentration. R may include at least one of K, Na, and Li. The method may also include flowing a molten second glass composition, the second glass composition comprising a second $R_2O$ concentration less than the first $R_2O$ concentration of the first glass composition and $SnO_2$ at a second $SnO_2$ concentration greater than or equal to the first $SnO_2$ concentration of the first glass composition. The molten first glass composition may be contacted with the molten second glass composition to form an interface between the molten first glass composition and the molten second glass composition, wherein R+ ions from the molten first glass composition may diffuse into the molten second glass composition and $Sn^{+2}$ ions from the molten second glass composition may diffuse into the molten first glass composition, chemically dissolving uncompensated oxygen anions in the molten first glass composition.

In yet another embodiment, a laminated glass article may include a first glass layer formed from a first glass composition comprising a first $R_2O$ concentration and a first fining agent with a first fining agent concentration, wherein R is an element from Group I of the periodic table. The laminated glass article may also include a second glass layer fused to the first glass layer, the second glass layer formed from a second glass composition comprising a second $R_2O$ concentration less than the first $R_2O$ concentration of the first glass composition and a second fining agent with a second fining agent concentration that is greater than or equal to the first fining agent concentration of the first glass composition.

Additional features and advantages of the methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
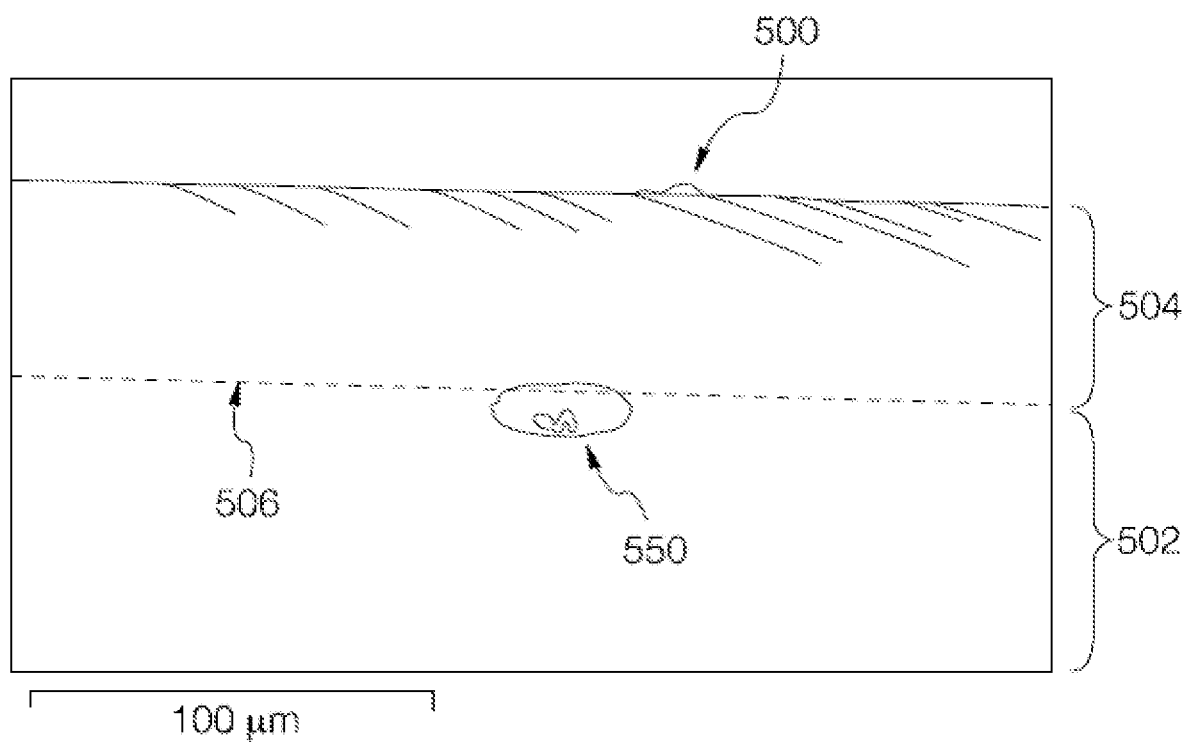
FIG. 1 is an SEM micrograph of a portion of a laminated glass article with a blister defect.

Reference will now be made in detail to embodiments of the methods for forming laminated glass articles described herein, examples of which are illustrated in the accompanying drawings. Whenever possible, the same reference numerals will be used throughout the drawings to refer to the same or like parts. According to one embodiment a method for forming a laminated glass article may include flowing a molten first glass composition, the first glass composition comprising a first $R_2O$ concentration and a first fining agent with a first fining agent concentration. R may be an element from Group I of the periodic table. The method may also include flowing a molten second glass composition, the second glass composition comprising a second $R_2O$ concentration less than the first $R_2O$ concentration of the first glass composition and a second fining agent with a second fining agent concentration that is greater than or equal to the first fining agent concentration of the first glass composition. The molten first glass composition may be contacted with the molten second glass composition to form an interface between the molten first glass composition and the molten second glass composition. Various embodiments of method of forming laminated glass articles, and laminated glass articles formed there from, will be described in more detail herein with specific reference to the appended drawings.

Laminated glass articles generally comprise two or more layers of glass which are fused together to form a single, unitary body. In various embodiments, a glass layer can comprise a glass material, a glass-ceramic material, or a combination thereof. In some laminated glass articles, the glass article may be strengthened through the lamination process by the development of compressive stresses. The compressive stresses which develop in laminated glass articles are attributable to the differences in the coefficient of thermal expansion in the glass from which glass article is formed. These differences in the coefficients of thermal expansion are, in turn, a result of compositional differences in the glasses. While these compositional differences can result in enhancing the strength or other properties of the finished glass article, these compositional differences can also result in the formation of defects in the glass.

Specifically, when two different glass compositions are joined together in the viscous or molten state to form a laminate structure, blister defects can form in one of the glass compositions adjacent to the interface between the two different glass compositions. Referring to FIG. 1, an SEM micrograph of a cross section of a conventionally formed laminated glass article 500 with a blister defect 550 is depicted. The conventional laminated glass article includes a first glass layer 502 fused to a second glass layer 504 at an interface 506. In this conventional laminated glass article 500, the first glass layer 502 is a core layer and the second glass layer 504 is a cladding layer of a laminated glass sheet. The blister defect 550 is formed in the first glass layer 502 adjacent to the interface 506 between the first glass layer 502 and the second glass layer 504. The blister defect 550 is a bubble or pocket containing oxygen and is formed in the viscous or molten glass during the fusion process. As the glass cools and solidifies, the blister defect remains, reducing the quality of the glass.

The composition of the first glass layer 502 and the second glass layer 504 may be different to achieve different attributes in the final article, such as strengthening by a compressive stress arising from thermal expansion mismatch as described above, or particular optical or chemical properties that may be desirable in only one of the glass layers. For example, it may be desirable that one of the glass layers be crystallizable, have certain solubility, or even a specific color, different than the glass layer to which it is fused. Achieving these properties may require the addition of mobile elements, such as alkali cations, that are initially added to the glass composition as oxide constituents. These ions impart specific physical and/or chemical characteristics to the glass composition to which they are added. However, due to their relatively high mobility in the glass, these cations can diffuse across the interface 506 between the first glass layer 502 and the second glass layer 504. As these cations diffuse across the interface 506, anions, such as oxygen anions, remain in the network but are no longer compensated or balanced by the cations. This changes the solubility of the anions in the network and may cause the anions to come out of solution and the form blister defects 550. These blisters defects form after the first glass layer 502 and the second glass layer 504 come into contact at temperatures above the glass transition temperature Tg, but well after the conventional method of removing blisters by high-temperature fining has been completed.

Figure 2:
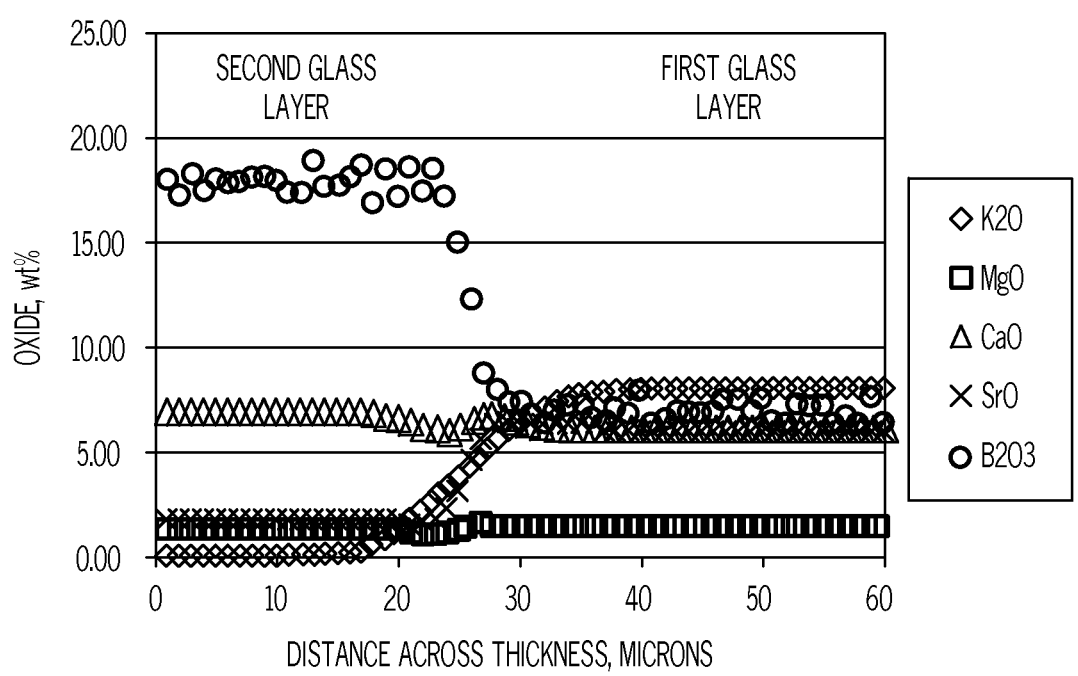
FIG. 2 graphically depicts the diffusion profile of glass constituent components across an interface of a conventional laminated glass article.

In the conventional laminated glass article 500 depicted in FIG. 1, it is believed that the blister defect 550 is caused by the diffusion of cations, in this case $K^+$ cations, across the interface from the first glass layer 502 to the second glass layer 504, which leaves uncompensated network oxygen behind in the first glass layer 502. This is evidenced by the diffusion profile of the constituent components across the interface 506 of the conventional laminated glass article 500 graphically depicted in FIG. 2.

More specifically, the migration of cations, such as $K^+$ ions, from the first glass layer 502 into the second glass layer 504 leaves behind uncompensated oxygen anions which form the blister defect 550, specifically oxygen bubbles, in the viscous glass of the first glass layer 502 proximate the interface 506. The formation of the oxygen bubble in the first glass layer 502 is represented by the following equation:

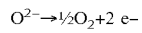

The conventional solution to preventing the formation of blister defects in a laminated glass structure is to add a fining agent (i.e., a multivalent element in oxide form) to the glass composition of the glass layer in which the blister defects form to compensate the oxygen anions remaining in the network following diffusion of the cations from the glass layer. However, it has been found that this conventional solution is not effective for reducing the formation of blister defects in laminated glass articles in which the concentration of alkali oxides is greater in the glass layer in which the blister defects form than in the opposing glass layer. Specifically, it is believed that the effectiveness of the fining agent is reduced due to the interaction and oxidation of the multivalent elements of the fining agent with other constituent components in the glass, reducing the availability of the multivalent elements to compensate the oxygen ions remaining in the network. The methods for forming laminated glass articles described herein mitigate the formation of blister defects at the interface between a first glass layer and a second glass layer of a laminated glass article.

Figure 3:
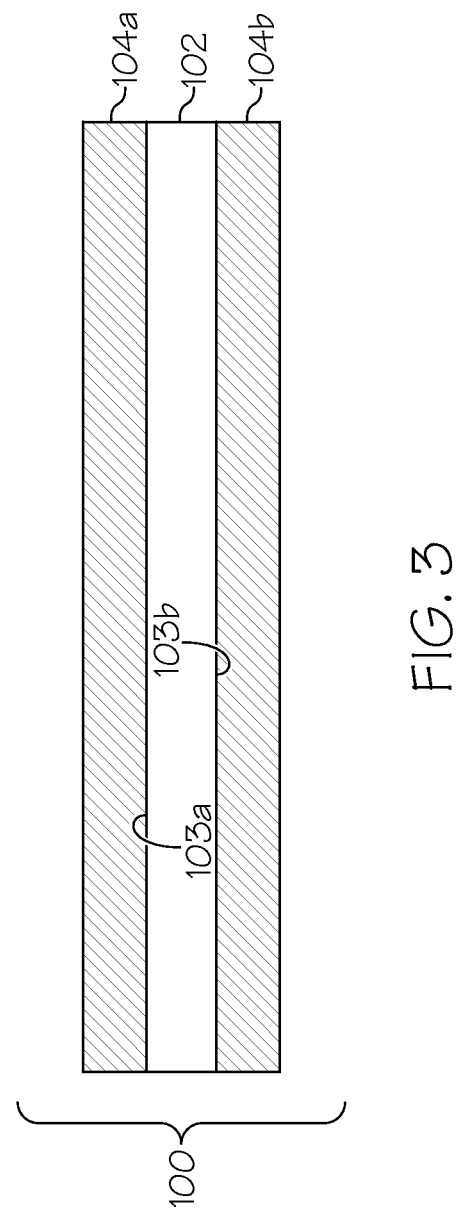
FIG. 3 schematically depicts a cross section of a portion of an exemplary embodiment of a laminated glass article.

Referring now to FIG. 3, a laminated glass article 100 is schematically depicted in cross section. The laminated glass article 100 generally comprises a glass core layer 102 and at least one glass cladding layer 104a. In the embodiment of the laminated glass article 100 shown in FIG. 3 the laminated glass article includes a pair of glass cladding layers 104a, 104b positioned on either side of the glass core layer 102. Alternatively, the laminated glass article 100 may be constructed as a bi-layer laminate, such as when one of the glass cladding layers 104a, 104b is omitted from the laminated glass article leaving a single glass cladding layer fused to the glass core layer.

While FIG. 3 schematically depicts the laminated glass article 100 as being a laminated glass sheet, it should be understood that other configurations and form factors are contemplated and possible. For example, the laminated glass article may have a non-planar configuration such as a curved glass sheet or the like. Alternatively, the laminated glass article may be a laminated glass tube, container, or the like.

Still referring to FIG. 3, the glass core layer 102 generally comprises a first surface 103a and a second surface 103b which is opposed to the first surface 103a. A first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional non-glass materials, such as adhesives, coating layers or the like, being disposed between the glass core layer 102 and the glass cladding layers 104a, 104b. Thus, the glass cladding layers 104a, 104b are fused directly to the glass core layer 102 or are directly adjacent to the glass core layer. In some embodiments, the laminated glass article comprises one or more intermediate layers disposed between the glass core layer and the glass cladding layer. For example, the intermediate layers comprise intermediate glass layers and/or diffusion layers formed at the interface of the glass core layer and the glass cladding layer (e.g., by diffusion of one or more components of the glass core and glass cladding layers into the diffusion layer). In some embodiments, the laminated glass article comprises a glass-glass laminate (e.g., an in situ fused multilayer glass-glass laminate) in which the interfaces between directly adjacent glass layers are glass-glass interfaces.

In the embodiments of the laminated glass articles described herein, the composition of the glass cladding layers 104a, 104b is different than the composition of the glass core layer 102 to achieve specific attributes in the final laminated glass article. For example, in some embodiments, the glass cladding layers 104a, 104b are formed from glass compositions which have an average cladding coefficient of thermal expansion $CTE_{clad}$ and the glass core layer 102 is formed from a different glass composition which has an average core coefficient of thermal expansion $CTE_{core}$. The $CTE_{core}$ is greater than $CTE_{clad}$ which results in the glass cladding layers 104a, 104b being compressively stressed without being ion-exchanged or thermally tempered. In some other embodiments, one or more of the glass cladding layers 104a, 104b may be formed from a glass composition which is more or less soluble in a particular solution than the glass composition from which the core layer 102 is formed. In still other embodiments, the glass cladding layers 104a, 104b may contain additional constituent components which alter the optical characteristics of the glass cladding layers 104a, 104b relative to the glass core layer. Accordingly, it should be understood that the composition of at least one of the glass cladding layers 104a, 104b is different than the composition of the glass core layer 102 to which it is fused.

In the embodiments described herein, the glass composition from which either the glass core layer 102 or one of the glass cladding layers 104a, 104b is formed includes a concentration of alkali oxide constituent components (also referred to as $R_2O$, where "R" denotes one or more elements from Group I of the periodic table) which is greater than the concentration of alkali oxide constituents components of the glass composition forming the glass layer to which it is fused. For purposes of the present description, the concentration of the alkali oxide constituent components of the glass composition is the concentration of alkali oxide constituent components in the glass composition prior to fusion of the glass composition with another glass composition. Also for purposes of the present description, a layer of glass formed from, comprising, or consisting essentially of a glass composition having a relatively greater concentration of alkali oxide constituent components than the glass composition to which it is to be fused is referred to herein as a "first glass layer" or a "first glass composition" and a layer of glass formed from, comprising, or consisting essentially of a glass composition having a relatively lower concentration of alkali oxide constituent components than the glass composition to which it is to be fused is referred to herein as a "second glass layer" or a "second glass composition."

For example, in embodiments where the laminated glass article is a tri-layer structure which includes a glass core layer 102 bound to two glass cladding layers 104a, 104b as depicted in FIG. 3, the glass core layer 102 may have a concentration of $R_2O$ which is greater than the concentration of $R_2O$ in either of the glass cladding layers 104a, 104b (i.e., the core layer 102 is a first glass layer and the cladding layers 104a, 104b are second glass layers) to which it is fused. Alternatively, one or both of the glass cladding layer 104a, 104b may have concentrations of $R_2O$ which are greater than the concentration of $R_2O$ in the glass core layer 102 to which they are fused (i.e., the glass cladding layers 104a, 104b is a first glass layer and the core layer 102 is a second glass layer). In embodiments where the laminated glass article 100 is a bi-layer structure (not shown), the glass core layer may have a concentration of $R_2O$ which is greater than the concentration of $R_2O$ in the cladding layer (i.e., the core layer is a first glass layer and the cladding layer is the second glass layer) to which it is fused. Alternatively, the glass cladding layer may have a concentration of $R_2O$ which is greater than the concentration of $R_2O$ in the glass core layer (i.e., the cladding layer is a first glass layer and the core layer is the second glass layer) to which it is fused.

In embodiments, the alkali oxide constituent component $R_2O$ includes at least one of Li, K, and Na and the concentration of the alkali oxide constituent component $R_2O$ (mol %) may be expressed as $\Sigma(Li_2O$ (mol %)+$K_2O$ (mol %)+$Na_2O$ (mol %)). Accordingly, it should be understood that, in some embodiments, the glass compositions forming the laminated glass article may include a single alkali oxide constituent component or a combination of two or more alkali oxide constituent components.

In embodiments, the concentration of the alkali oxide constituent components $R_2O$ in the glass composition from which the first glass layer of the laminated glass article is formed (i.e., the concentration of the alkali oxide constituent components prior to fusion with the second glass layer) is at least 3 mol % greater than the concentration of alkali oxide constituent components $R_2O$ in the glass composition from which the second layer of the laminated glass article is formed (i.e., the concentration of the alkali oxide constituent component prior to fusion with the first glass layer). It has been found that, when the difference in the alkali concentration between the first glass layer and the second glass layer is less than about 3 mol %, blister defect formation is nominal. However, when the difference in the alkali concentration between the first glass layer and the second glass layer is greater than or equal to about 3 mol %, blister defect formation dramatically increases and is readily observable.

As noted hereinabove, the difference in the concentration of the alkali oxide constituent components in the glass compositions can cause the formation of blister defects as cations from the first glass layer diffuse into the second glass layer, leaving behind unbalanced oxygen anions. The diffusion of the alkali cations decreases the chemical solubility of the oxygen anions in the glass network, causing the oxygen anions to come out of solution and form blister defects.

However, in the embodiments described herein, the formation of blister defects in the first glass layer is mitigated by the addition of fining agents to the glass compositions forming both the first glass layer and the second glass layer.

Specifically, in addition to the relatively greater concentration of alkali oxide constituent components $R_2O$, the first glass composition forming the first glass layer also includes at least one first fining agent added to the glass composition at a first fining agent concentration. Similarly, the second glass composition forming the second glass layer includes a second fining agent added to the glass composition at a second fining agent concentration. In the embodiments described herein, the second fining agent concentration is greater than or equal to the first fining agent concentration. In some other embodiments, the second fining agent concentration is greater than the first fining agent concentration.

The first fining agent and the second fining agent may include conventional fining agent materials such as oxides of multivalent elements. These fining agent materials generally include multivalent elements having a lower valence state (i.e., oxides of multivalent elements in a reduced state). Suitable fining agent materials include, without limitation, oxides of Mn, oxides of Ce, oxides of As, oxides of Sb, oxides of Fe, oxides of Sn or various combinations thereof. In the embodiments described herein, the concentration of fining agents are specified in the higher valence or oxidized state. For example, the concentration of oxides of Mn, when added as a fining agent, are expressed in terms of the concentration of $MnO_2$. The first fining agent and the second fining agent may include a single fining agent material or a combination of several fining agent materials. In the embodiments described herein, the concentration of the first fining agent is the sum of the concentration of each individual fining agent material included in the first fining agent. Similarly, the concentration of the second fining agent is the sum of the concentration of each individual fining agent material included in the second fining agent. In embodiments, the first fining agent and the second fining agent include the same fining agent materials, albeit in different concentrations. For example, in one embodiment, the first fining agent and the second fining agent are $SnO_2$.

The first fining agent may be present in the first glass composition at a first fining agent concentration which is greater than or equal to 0.02 mol % and less than or equal to 0.44 mol %. For example, in one embodiment, the first fining agent is present in the first glass composition in a concentration which is greater than or equal to 0.02 mol % and less than or equal to 0.2 mol %. In another embodiment, the first fining agent is present in the first glass composition in a concentration which is greater than or equal to 0.02 mol % and less than or equal to 0.11 mol %. In embodiments where $SnO_2$ is the first fining agent, $SnO_2$ may be present in a concentration greater than or equal to about 0.04 mol % and less than or equal to about 0.17 mol %.

In embodiments where the first fining agent comprises $SnO_2$, the $SnO_2$ is present in the first glass composition in a concentration such that a ratio of the concentration of $Sn^{+2}$ ions to the total concentration of Sn (all forms) in the first glass composition is greater than or equal to 0.2. In some embodiments, $SnO_2$ is present in the first glass composition in a concentration such that a ratio of the concentration of $Sn^{+2}$ ions to the total concentration of Sn (all forms) in the first glass composition is greater than or equal to 0.25 or even greater than or equal to 0.3. Having the ratio of $Sn^{+2}$ to the total concentration of Sn in the first glass composition aids in compensating excess oxygen anions in the glass network formed by the first glass composition due to the diffusion of alkali ions from the glass network.

The second fining agent may be present in the second glass composition at a second fining agent concentration which is greater than or equal to 0.02 mol % and less than or equal to 0.44 mol %. For example, in one embodiment, the second fining agent is present in the second glass composition in a concentration which is greater than or equal to 0.02 mol % and less than or equal to 0.22 mol %. In another embodiment, the second fining agent is present in the second glass composition in a concentration which is greater than or equal to 0.02 mol % and less than or equal to 0.11 mol %.

The addition of the first fining agent to the first glass composition which contains a relatively greater concentration of alkali oxides and the addition of a second fining agent to the second glass composition in a concentration greater than that of the first fining agent in the first glass composition mitigates the formation of blister defects through several mechanisms.

First, the addition of the first fining agent to the first glass composition aids in converting at least a portion of the physically dissolved oxygen (i.e., uncompensated oxygen anions) in the first glass composition to chemically dissolved oxygen in the network of the first glass composition, reducing the amount of uncompensated oxygen which may potentially create blister defects.

Second, the addition of the second fining agent to the second glass composition in excess of the concentration of the first fining agent converts physically dissolved oxygen in the second glass composition into chemically dissolved oxygen in the network of the second glass composition which, in turn, decreases the amount of physically dissolved oxygen in the second glass composition to below the oxygen solubility limit of the second glass composition. This allows excess oxygen from the first glass composition (which is supersaturated in physically dissolved oxygen due to the diffusion of the alkali ions) to diffuse across the interface and into the second glass composition, decreasing the amount of physically dissolved oxygen in the first glass composition to below the oxygen solubility limit of the first glass composition and, as a result, decreasing the potential for creating blister defects in the first glass composition.

Simultaneously, the multivalent elements of the second fining agent in the second glass composition (e.g., Sn or the like) migrate from the second glass composition through the interface and into the first glass composition. The multivalent elements interact with the excess physically dissolved oxygen in the first glass composition and convert the physically dissolved oxygen into chemically dissolved oxygen in the network of the first glass composition, mitigating the formation of blister defects.

The techniques for reducing blister defect formation in a laminated glass article are not limited to any particular glass composition or pair of glass compositions and are particularly useful for pairs of glass compositions in which one of the glass compositions has an excess concentration of alkali oxide constituent components relative to the other glass composition of the pair. For example, the techniques for reducing blister defect formation described herein may be used to in conjunction with glass pairs in which the first glass layer is formed from a first glass composition which has an alkali concentration $R_2O$ which is at least 3 mol % greater than the alkali concentration $R_2O$ of the second glass composition which forms the second glass layer. For instance, the techniques for reducing blister defect formation described herein may be used in conjunction with glass pairs in which the first glass layer is formed from a first glass composition having an alkali concentration $R_2O$ which is greater than 3 mol % and the second glass layer is formed from a second glass composition having an alkali concentration $R_2O$ which is less than or equal to 0.7 mol %, provided that the difference in the alkali concentrations is at least 3 mol %. The techniques for reducing blister defect formation described herein are particularly suitable for glass compositions having open glass structures which support the rapid diffusion of ions across the interface between the glass layers. Such glass compositions include, without limitation, those glass structures having greater than or equal to 7 mol % or even 8 mol % $B_2O_3$ in conjunction with greater than or equal to 50 mol % $SiO_2$.

Various glass compositions for forming the first and second glass layers will now be described generally and with reference to several specific glass compositions. While a plurality of different glass compositions will be described, it should be understood that, for purposes of the methods and glass articles described herein, glass pairings are selected such that the first glass composition comprises a first $R_2O$ concentration (where R is an element from Group I of the periodic table) and a first fining agent with a first fining agent concentration and the second glass composition comprises a second $R_2O$ concentration less than the first $R_2O$ concentration of the first glass composition and a second fining agent with a second fining agent concentration that is greater than or equal to the first fining agent concentration of the first molten glass composition.

A first exemplary composition space from which the first glass composition may be selected may include a glass network former selected from the group consisting of $SiO_2$, $Al_2O_3$, $B_2O_3$, and combinations thereof. For example, glass compositions within the first exemplary composition space comprise at least about 50 mol % $SiO_2$, at least about 55 mol % $SiO_2$, at least about 60 mol % $SiO_2$, or at least about 65 mol % $SiO_2$. Additionally, or alternatively, glass compositions within the first exemplary composition space comprise at most about 80 mol % $SiO_2$, at most about 70 mol % $SiO_2$, at most about 68 mol % $SiO_2$, or at most about 60 mol % $SiO_2$. Additionally, or alternatively, glass compositions within the first exemplary composition space comprise at least about 5 mol % $Al_2O_3$, at least about 9 mol % $Al_2O_3$, or at least about 12 mol % $Al_2O_3$. Additionally, or alternatively, glass compositions within the first exemplary composition space comprise at most about 20 mol % $Al_2O_3$, at most about 17 mol % $Al_2O_3$, or at most about 11 mol % $Al_2O_3$. Additionally, or alternatively, glass compositions within the first exemplary composition space comprise at least about 3 mol % $B_2O_3$, at least about 6 mol % $B_2O_3$, or at least about 7 mol % $B_2O_3$. Additionally, or alternatively, glass compositions within the first exemplary composition space comprise at most about 11 mol % $B_2O_3$, at most about 8 mol % $B_2O_3$, or at most about 4 mol % $B_2O_3$.

In some embodiments, glass compositions within the first exemplary composition space comprise an alkali metal oxide selected from the group consisting of $Li_2O$, $Na_2O$, $K_2O$, and combinations thereof. For example, glass compositions within the first exemplary composition space comprise at least about 0.05 mol % $Na_2O$, at least about 10 mol % $Na_2O$, or at least about 13 mol % $Na_2O$. Additionally, or alternatively, glass compositions within the first exemplary composition space comprise at most about 16 mol % $Na_2O$, at most about 14 mol % $Na_2O$, at most about 2 mol % $Na_2O$, or at most about 0.1 mol % $Na_2O$. Additionally, or alternatively, glass compositions within the first exemplary composition space comprise at least about 0.01 mol % $K_2O$, at least about 2 mol % $K_2O$, or at least about 8 mol % $K_2O$. Additionally, or alternatively, glass compositions within the first exemplary composition space comprise at most about 15 mol % $K_2O$, at most about 9 mol % $K_2O$, at most about 6 mol % $K_2O$, or at most about 0.1 mol % $K_2O$.

In some embodiments, the glass compositions within first exemplary composition space comprise an alkaline earth oxide selected from the group consisting of MgO, CaO, SrO, BaO, and combinations thereof. For example, glass compositions within the first exemplary composition space comprise at least about 1 mol % MgO, at least about 2 mol % MgO, at least about 3 mol % MgO, or at least about 4 mol % MgO. Additionally, or alternatively, glass compositions within the first exemplary composition space comprise at most about 8 mol % MgO, at most about 4 mol % MgO, or at most about 3 mol % MgO. Additionally, or alternatively, glass compositions within the first exemplary composition space comprise at least about 0.01 mol % CaO, at least about 2 mol % CaO, at least about 4 mol % CaO, at least about 5 mol % CaO, or at least about 6 mol % CaO. Additionally, or alternatively, glass compositions within the first exemplary composition space comprise at most about 8 mol % CaO, at most about 7 mol % CaO, or at most about 0.1 mol % CaO. Additionally, or alternatively, glass compositions within the first exemplary composition space comprise at least about 3 mol % SrO, at least about 4 mol % SrO, at least about 5 mol % SrO, or at least about 6 mol % SrO. Additionally, or alternatively, glass compositions within the first exemplary composition space comprise at most about 7 mol % SrO, at most about 6 mol % SrO, or at most about 5 mol % SrO. Additionally, or alternatively, glass compositions within the first exemplary composition space comprise at least about 0.01 mol % BaO, at least about 0.02 mol % BaO, or at least about 0.07 mol % BaO. Additionally, or alternatively, glass compositions within the first exemplary composition space comprise at most about 0.1 mol % BaO, at most about 0.09 mol % BaO, or at most about 0.05 mol % BaO.

In some embodiments, glass compositions within the first exemplary composition space comprise one or more additional components including, for example $SnO_2$, $Sb_2O_3$, $As_2O_3$, $Ce_2O_3$, Cl (e.g., derived from KCl or NaCl), $ZrO_2$, or $Fe_2O_3$.

Specific glass compositions falling within the first exemplary composition space and suitable for use as the first glass composition are included in Table 1 below.

TABLE 1

Exemplary First Glass Compositions (mol %)

| Sample | $SiO_2$ | $Al_2O_3$ | $B_2O_3$ | $Na_2O$ | $K_2O$ | MgO | CaO | SrO | BaO | $SnO_2$ | $ZrO_2$ | $Fe_2O_3$ | $As_2O_3$ |
|---|---|---|---|---|---|---|---|---|---|---|---|---|---|
| 1-1 | 61.97 | 10.89 | 10.09 | 0.07 | 2.17 | 6.16 | 5.45 | 3.09 | 0.03 | 0.04 | 0.01 | 0.01 | |
| 1-2 | 66.54 | 10.03 | 6 | 0.09 | 5.79 | 1.9 | 6.23 | 3.28 | 0.04 | 0.07 | 0.02 | 0.01 | |
| 1-3 | 63.46 | 9.56 | 7.09 | 0.09 | 5.79 | 2.49 | 7.41 | 3.95 | 0.04 | 0.07 | 0.03 | 0.01 | |
| 1-4 | 69.05 | 10.2 | | 15.13 | | 5.49 | | | | 0.13 | | | |
| 1-5 | 56.12 | 16.73 | 10.5 | 0.064 | 3.084 | 3.74 | 4.61 | 4.83 | 0.08 | 0.092 | 0.023 | 0.033 | 0.0002 |
| 1-6 | 59.05 | 15.1 | 6.26 | 0.086 | 8.059 | 1.13 | 5.16 | 5.02 | 0.08 | 0.151 | 0.032 | 0.031 | 0.0002 |
| 1-7 | 56.24 | 14.38 | 7.16 | 0.084 | 8.042 | 1.48 | 6.13 | 6.04 | 0.1 | 0.164 | 0.051 | 0.032 | 0.0002 |
| 1-8 | 67.45 | 12.69 | 3.67 | 13.67 | 0.02 | 2.36 | 0.03 | | | 0.09 | 0.01 | 0.01 | |
| 1-9 | 69.17 | 8.53 | | 13.94 | 1.17 | 6.45 | 0.54 | | | 0.19 | | | |
| 1-10 | 68.84 | 10.63 | | 14.86 | 0.02 | 5.43 | 0.04 | | | 0.17 | | | |

A second exemplary composition space from which the second glass composition may be selected may include a glass network former selected from the group consisting of $SiO_2$, $Al_2O_3$, $B_2O_3$, and combinations thereof. For example, glass compositions within the second exemplary composition space comprise at least about 60 mol % $SiO_2$, at least about 62 mol % $SiO_2$, or at least about 67 mol % $SiO_2$. Additionally, or alternatively, glass compositions within the second exemplary composition space comprise at most about 70 mol % $SiO_2$, at most about 68 mol % $SiO_2$, at most about 65 mol % $SiO_2$, or at most about 63 mol % $SiO_2$. Additionally, or alternatively, glass compositions within the second exemplary composition space comprise at least about 6 mol % $Al_2O_3$, at least about 10 mol % $Al_2O_3$, or at least about 12 mol % $Al_2O_3$. Additionally, or alternatively, glass compositions within the second exemplary composition space comprise at most about 18 mol % $Al_2O_3$, at most about 13 mol % $Al_2O_3$, or at most about 8 mol % $Al_2O_3$. Additionally, or alternatively, glass compositions within the second exemplary composition space comprise at least about 4 mol % $B_2O_3$, at least about 6 mol % $B_2O_3$, at least about 9 mol % $B_2O_3$, or at least about 16 mol % $B_2O_3$. Additionally, or alternatively, glass compositions within the second exemplary composition space comprise at most about 21 mol % $B_2O_3$, at most about 18 mol % $B_2O_3$, or at most about 11 mol % $B_2O_3$.

In some embodiments, the second exemplary composition space comprises an alkali metal oxide selected from the group consisting of $Li_2O$, $Na_2O$, $K_2O$, and combinations thereof. For example, glass compositions within the second exemplary composition space comprise from about 0 mol % to about 0.1 mol % $Na_2O$, or from about 0 mol % to about 0.06 mol % $Na_2O$. Additionally, or alternatively, glass compositions within the second exemplary composition space comprise from about 0 mol % to about 0.05 mol % $K_2O$, or from about 0 mol % to about 0.03 mol % $K_2O$. In some embodiments, glass compositions within the second exemplary composition space are substantially free of alkali metal. For example, glass compositions within the second exemplary composition space comprise at most about 0.1 mol % alkali metal oxide. In other embodiments, glass compositions within the second exemplary composition space comprise from about 5 mol % to about 10 mol % alkali metal oxide.

In some embodiments, glass compositions within the second exemplary composition space comprise an alkaline earth oxide selected from the group consisting of MgO, CaO, SrO, BaO, and combinations thereof. For example, glass compositions within the second exemplary composition space comprise at least about 0.2 mol % MgO, at least about 1 mol % MgO, or at least about 3 mol % MgO. Additionally, or alternatively, glass compositions within the second exemplary composition space comprise at most about 5 mol % MgO, at most about 4 mol % MgO, at most about 2 mol % MgO, or at most about 0.5 mol % MgO. Additionally, or alternatively, glass composition within the second exemplary composition space comprise at least about 3 mol % CaO, at least about 4 mol % CaO, at least about 5 mol % CaO, or at least about 8 mol % CaO. Additionally, or alternatively, glass compositions within the second exemplary composition space comprise at most about 12 mol % CaO, at most about 9 mol % CaO, at most about 8 mol % CaO, or at most about 5 mol % CaO. Additionally, or alternatively, glass compositions within the second exemplary composition space comprise at least about 0.2 mol % SrO, at least about 1 mol % SrO, or at least about 2 mol % SrO. Additionally, or alternatively, glass compositions within the second exemplary composition space comprise at most about 3 mol % SrO, at most about 2 mol % SrO, or at most about 1 mol % SrO. Additionally, or alternatively, glass compositions within the second exemplary composition space comprise at least about 0.01 mol % BaO, at least about 0.02 mol % BaO, or at least about 1 mol % BaO. Additionally, or alternatively, glass compositions within the second exemplary composition space comprise at most about 2 mol % BaO, at most about 0.5 mol % BaO, at most about 0.03 mol % BaO, or at most about 0.02 mol % BaO. In some embodiments, glass compositions within the second exemplary composition space comprise from about 3 mol % to about 16 mol % alkaline earth oxide.

In some embodiments, glass compositions within the second exemplary composition space comprise one or more additional components including, for example $SnO_2$, $Sb_2O_3$, $As_2O_3$, $Ce_2O_3$, Cl (e.g., derived from KCl or NaCl), $ZrO_2$, or $Fe_2O_3$.

Specific glass compositions falling within the second exemplary composition space and suitable for use as the second glass composition are included in Table 2 below.

TABLE 2

Exemplary Second Glass Compositions (mol %)

| Sample | SiO$_2$ | Al$_2$O$_3$ | B$_2$O$_3$ | Na$_2$O | K$_2$O | MgO | CaO | SrO | BaO | SnO$_2$ | ZrO$_2$ | Fe$_2$O$_3$ | As$_2$O$_3$ |
|---|---|---|---|---|---|---|---|---|---|---|---|---|---|
| 2-1 | 69.44 | 12.36 | 4.35 | | | 4.01 | 5.98 | 1.73 | 1.98 | 0.1 | 0.03 | 0.02 | |
| 2-2 | 67.55 | 11 | 9.83 | | | 2.26 | 8.73 | 0.52 | | 0.07 | 0.02 | 0.01 | |
| 2-3 | 62.93 | 10.74 | 13.16 | | | 3.58 | 7.32 | 2.17 | 0.01 | 0.07 | | 0.01 | |
| 2-4 | 64.59 | 7.38 | 16.45 | | | 2.21 | 8.14 | 1.11 | 0.01 | 0.06 | | 0.01 | |
| 2-5 | 60.48 | 11.55 | 17.6 | 0.05 | 0.22 | 1.38 | 7.01 | 1.86 | 0.02 | 0.208 | 0.14 | 0.039 | 0.0004 |
| 2-6 | 62.39 | 17.21 | 10.5 | | | 1.41 | 7.51 | 0.83 | | 0.16 | | | |
| 2-7 | 67.29 | 6.47 | 20.99 | | | 0.35 | 4.49 | 0.29 | 0.01 | 0.05 | 0.05 | 0.01 | |

A third exemplary composition space from which the first glass composition may be selected may comprise from about 62 mol % to about 77 mol % SiO$_2$. Additionally, or alternatively, glass compositions within the third exemplary composition space comprise from about 2 mol % to about 13 mol % Al$_2$O$_3$. Additionally, or alternatively, glass compositions within the third exemplary composition space comprises from about 0 mol % to about 10 mol % B$_2$O$_3$. Additionally, or alternatively, glass compositions within the third exemplary composition space comprise an alkali metal oxide selected from the group consisting of Na$_2$O, K$_2$O, and combinations thereof. For example, glass compositions within the third exemplary composition space comprise from about 0 mol % to about 15 mol % Na$_2$O and/or from about 0 mol % to about 12 mol % K$_2$O. Additionally, or alternatively, glass compositions within the third exemplary composition space comprise an alkaline earth oxide selected from the group consisting of CaO, MgO, SrO, BaO, and combinations thereof. For example, glass compositions within the third exemplary composition space comprise from about 0 mol % to about 1 mol % CaO, from about 2 mol % to about 7 mol % MgO from about 0 mol % to about 7 mol % SrO, and/or from about 0 mol % to about 3 mol % BaO. Additionally, or alternatively, glass compositions within the third exemplary composition space comprise from about 0 mol % to about 1 mol % SnO$_2$. In some embodiments, the difference between the alkali metal oxide (R$_2$O) concentration of glass compositions within the third exemplary composition space and the Al$_2$O$_3$ concentration of the glass compositions within third exemplary composition space is from about 1 to about 9.

Specific glass compositions falling within the third exemplary composition space and suitable for use as the first glass composition are included in Table 3 below.

TABLE 3

Exemplary First Glass Compositions (mol %)

| Sample | SiO$_2$ | Al$_2$O$_3$ | B$_2$O$_3$ | Na$_2$O | K$_2$O | MgO | CaO | SnO$_2$ |
|---|---|---|---|---|---|---|---|---|
| 3-1 | 66 | 10.26 | 0.58 | 14.23 | 2.37 | 5.75 | 0.59 | 0.21 |
| 3-2 | 69.18 | 8.47 | 0 | 13.92 | 1.16 | 6.54 | 0.53 | 0.19 |
| 3-3 | 68.84 | 10.63 | 0 | 14.86 | 0.02 | 5.43 | 0.04 | 0.17 |
| 3-4 | 67.45 | 12.69 | 3.67 | 13.67 | 0.02 | 2.36 | 0.03 | 0.09 |

A fourth exemplary composition space from which the second glass composition may be selected may comprise SiO$_2$, which can serve as a glass network former. For example, glass compositions within the fourth exemplary composition space comprise from about 45 mol % to about 60 mol % SiO$_2$. If the concentration of SiO$_2$ is too low, glass compositions within the fourth exemplary composition space can be incompatible with Zr, which is a common component found in fusion-draw equipment (e.g., in refractory). If the concentration of SiO$_2$ is too high, glass compositions within the fourth exemplary composition space can have an undesirably high durability and can have a sufficiently high melting point to adversely impact the formability of the glass.

In the embodiments described herein, the fourth exemplary composition space also comprises Al$_2$O$_3$, which can serve as a glass network former. For example, glass compositions within the fourth exemplary composition space comprise from about 8 mol % to about 19 mol % Al$_2$O$_3$. The presence of Al$_2$O$_3$ can reduce the liquidus temperature of the glass compositions within fourth exemplary composition space, thereby increasing the liquidus viscosity of the glass compositions within fourth exemplary composition space. If the concentration of Al$_2$O$_3$ is too low, glass compositions within the fourth exemplary composition space can be undesirably soft (e.g., the strain point can be undesirably low) and can have an undesirably high CTE. If the concentration of Al$_2$O$_3$ is too high, glass compositions within the fourth exemplary composition space can be incompatible with Zr and can have an undesirably high durability.

In some embodiments, glass compositions within the fourth exemplary composition space comprise B$_2$O$_3$, which can serve as a glass network former. For example, glass compositions within the fourth exemplary composition space comprise from about 0 mol % to about 25 mol % B$_2$O$_3$. The presence of B$_2$O$_3$ can reduce the durability of glass compositions within the fourth exemplary composition space. Additionally, or alternatively, the presence of B$_2$O$_3$ can reduce the viscosity and the liquidus temperature of glass compositions within the fourth exemplary composition space. For example, increasing the concentration of B$_2$O$_3$ by 1 mol % can decrease the temperature required to obtain an equivalent viscosity by about 10° C. to about 14° C., depending on the glass composition. However, increasing the concentration of B$_2$O$_3$ by 1 mol % can lower the liquidus temperature by about 18° C. to about 22° C., depending on the glass composition. Thus, B$_2$O$_3$ can reduce the liquidus temperature of the glass composition more rapidly than it decreases the liquidus viscosity. If the concentration of B$_2$O$_3$ is too low, glass compositions within the fourth exemplary composition space can have an undesirably high durability. If the concentration of B$_2$O$_3$ is too high, glass compositions within the fourth exemplary composition space can be undesirably soft.

In some embodiments, glass compositions within the fourth exemplary composition space comprise an alkali metal oxide selected from the group consisting of Li$_2$O, Na$_2$O, K$_2$O, and combinations thereof. For example, glass compositions within the fourth exemplary composition space comprise from about 0 mol % to about 8 mol % Li$_2$O. Additionally, or alternatively, glass compositions within the fourth exemplary composition space comprise from about 0 mol % to about 21 mol % Na$_2$O. Additionally, or alternatively, glass compositions within the fourth exemplary composition space comprise from about 0 mol % to about 12 mol % $K_2O$. The alkali metal oxide can serve as a modifier. For example, the presence of $Na_2O$ can reduce the melting temperature of the glass compositions within the fourth exemplary composition space, which can enhance the formability of glass compositions within the fourth exemplary composition space. In embodiments comprising $Na_2O$, if the concentration of $Na_2O$ is too low, glass compositions within the fourth exemplary composition space can have an undesirably high durability. If the concentration of $Na_2O$ is too high, glass compositions within the fourth exemplary composition space can have an undesirably high CTE.

In some embodiments, glass compositions within the fourth exemplary composition space comprises an alkaline earth oxide selected from the group consisting of CaO, MgO, SrO, and combinations thereof. For example, glass compositions within the fourth exemplary composition space comprise from about 0 mol % to about 10 mol % CaO. Additionally, or alternatively, glass compositions within the fourth exemplary composition space comprise from about 0 mol % to about 2 mol % MgO. Additionally, or alternatively, glass compositions within the fourth exemplary composition space comprise from about 0 mol % to about 2 mol % SrO.

In some embodiments, glass compositions within the fourth exemplary composition space comprise a fining agent selected from the group consisting of $SnO_2$, $Sb_2O_3$, $Ce_2O_3$, Cl (e.g., derived from KCl or NaCl), and combinations thereof. For example, glass compositions within the fourth exemplary composition space comprises from about 0 mol % to about 0.1 mol % $SnO_2$.

In some embodiments, glass compositions within the fourth exemplary composition space comprise $P_2O_5$. For example, glass compositions within the fourth exemplary composition space comprise from about 0 mol % to about 10 mol % $P_2O_5$.

In some embodiments, glass compositions within the fourth exemplary composition space comprise trace amounts of $ZrO_2$. For example, glass compositions within the fourth exemplary composition space comprise from about 0 mol % to about 0.02 mol % $ZrO_2$.

In some embodiments, glass compositions within the fourth exemplary composition space are substantially free of any or all of Pb, As, Cd, and Ba (i.e., constituents comprising the listed elements). For example, glass compositions within the fourth exemplary composition space are substantially free of Pb. Additionally, or alternatively, glass compositions within the fourth exemplary composition space are substantially free of As. Additionally, or alternatively, glass compositions within the fourth exemplary composition space are substantially free of Cd. Additionally, or alternatively, glass compositions within the fourth exemplary composition space are substantially free of Ba.

Specific glass compositions falling within the fourth exemplary composition space and suitable for use as the second glass composition are included in Table 4 below.

TABLE 4

Exemplary Second Glass Compositions (mol %)

| Sample | $SiO_2$ | $Al_2O_3$ | $B_2O_3$ | CaO | $Li_2O$ | $Na_2O$ | $K_2O$ | $SnO_2$ | $ZrO_2$ | $P_2O_5$ |
|---|---|---|---|---|---|---|---|---|---|---|
| 4-1 | 57 | 18.8 | 5 | 0 | 0 | 18.7 | 0.5 | 0.1 | 0.02 | 0 |
| 4-2 | 55 | 18.8 | 7 | 0 | 0 | 18.7 | 0.5 | 0.1 | 0.02 | 0 |
| 4-3 | 53 | 18.8 | 9 | 0 | 0 | 18.7 | 0.5 | 0.1 | 0.02 | 0 |
| 4-4 | 51 | 18.8 | 11 | 0 | 0 | 18.7 | 0.5 | 0.1 | 0.02 | 0 |
| 4-5 | 49 | 18.8 | 13 | 0 | 0 | 18.7 | 0.5 | 0.1 | 0.02 | 0 |
| 4-6 | 57 | 18.8 | 5 | 0 | 2 | 16.7 | 0.5 | 0.1 | 0.02 | 0 |
| 4-7 | 57 | 18.8 | 5 | 0 | 4 | 14.7 | 0.5 | 0.1 | 0.02 | 0 |
| 4-8 | 57 | 18.8 | 5 | 0 | 8 | 10.7 | 0.5 | 0.1 | 0.02 | 0 |
| 4-9 | 57 | 18 | 7 | 0 | 0 | 18 | 0 | 0.1 | 0 | 0 |
| 4-10 | 57 | 17 | 9 | 0 | 0 | 17 | 0 | 0.1 | 0 | 0 |
| 4-11 | 57 | 16 | 11 | 0 | 0 | 16 | 0 | 0.1 | 0 | 0 |
| 4-12 | 57 | 15 | 13 | 0 | 0 | 15 | 0 | 0.1 | 0 | 0 |
| 4-13 | 57.13 | 13.96 | 15.16 | 0.02 | 0 | 13.63 | 0 | 0.09 | 0 | 0 |
| 4-14 | 57 | 13 | 17 | 0 | 0 | 13 | 0 | 0.1 | 0 | 0 |
| 4-15 | 57.9 | 15 | 10 | 2 | 0 | 15 | 0 | 0.1 | 0 | 0 |
| 4-16 | 57.9 | 15 | 10 | 2 | 0 | 12 | 3 | 0.1 | 0 | 0 |
| 4-17 | 57.9 | 15 | 10 | 2 | 0 | 9 | 6 | 0.1 | 0 | 0 |
| 4-18 | 57.9 | 15 | 10 | 2 | 0 | 6 | 9 | 0.1 | 0 | 0 |
| 4-19 | 57.9 | 15 | 10 | 2 | 0 | 3 | 12 | 0.1 | 0 | 0 |
| 4-20 | 55 | 15 | 13 | 2 | 0 | 6 | 9 | 0.1 | 0 | 0 |
| 4-21 | 55 | 15 | 13 | 2 | 0 | 9 | 6 | 0.1 | 0 | 0 |
| 4-22 | 55 | 15 | 13 | 2 | 0 | 12 | 3 | 0.1 | 0 | 0 |
| 4-23 | 55 | 15 | 13 | 2 | 0 | 15 | 0 | 0.1 | 0 | 0 |
| 4-24 | 53 | 15 | 15 | 2 | 0 | 6 | 9 | 0.1 | 0 | 0 |
| 4-25 | 53 | 15 | 15 | 2 | 0 | 9 | 6 | 0.1 | 0 | 0 |
| 4-26 | 53 | 15 | 15 | 2 | 0 | 12 | 3 | 0.1 | 0 | 0 |
| 4-27 | 53 | 15 | 15 | 2 | 0 | 15 | 0 | 0.1 | 0 | 0 |
| 4-28 | 51 | 15 | 17 | 2 | 0 | 6 | 9 | 0.1 | 0 | 0 |
| 4-29 | 51 | 15 | 17 | 2 | 0 | 9 | 6 | 0.1 | 0 | 0 |
| 4-30 | 51 | 15 | 17 | 2 | 0 | 12 | 3 | 0.1 | 0 | 0 |
| 4-31 | 51 | 15 | 17 | 2 | 0 | 15 | 0 | 0.1 | 0 | 0 |
| 4-32 | 56 | 16 | 11 | 2 | 0 | 16 | 0 | 0.07 | 0 | 0 |
| 4-33 | 56 | 16 | 11 | 4 | 0 | 16 | 0 | 0.07 | 0 | 0 |
| 4-34 | 56 | 18 | 7 | 1 | 0 | 18 | 0 | 0.07 | 0 | 0 |
| 4-35 | 56 | 18 | 7 | 2 | 0 | 18 | 0 | 0.07 | 0 | 0 |
| 4-36 | 56 | 18 | 7 | 4 | 0 | 18 | 0 | 0.07 | 0 | 0 |
| 4-37 | 55 | 17 | 11 | 0 | 0 | 17 | 0 | 0.07 | 0 | 0 |
| 4-38 | 54 | 17.5 | 11 | 0 | 0 | 17.5 | 0 | 0.07 | 0 | 0 |
| 4-39 | 53 | 18 | 11 | 0 | 0 | 18 | 0 | 0.07 | 0 | 0 |
| 4-40 | 55 | 16 | 13 | 0 | 0 | 16 | 0 | 0.07 | 0 | 0 |

TABLE 4-continued

Exemplary Second Glass Compositions (mol %)

| Sample | SiO$_2$ | Al$_2$O$_3$ | B$_2$O$_3$ | CaO | Li$_2$O | Na$_2$O | K$_2$O | SnO$_2$ | ZrO$_2$ | P$_2$O$_5$ |
|---|---|---|---|---|---|---|---|---|---|---|
| 4-41 | 54 | 16 | 14 | 0 | 0 | 16 | 0 | 0.07 | 0 | 0 |
| 4-42 | 53 | 16 | 15 | 0 | 0 | 16 | 0 | 0.07 | 0 | 0 |
| 4-43 | 57 | 17.5 | 7 | 0 | 0 | 18.5 | 0 | 0.1 | 0 | 0 |
| 4-44 | 57 | 17 | 7 | 0 | 0 | 19 | 0 | 0.1 | 0 | 0 |
| 4-45 | 57 | 16.5 | 7 | 0 | 0 | 19.5 | 0 | 0.1 | 0 | 0 |
| 4-46 | 57 | 16 | 7 | 0 | 0 | 20 | 0 | 0.1 | 0 | 0 |
| 4-47 | 57 | 15.5 | 7 | 0 | 0 | 20.5 | 0 | 0.1 | 0 | 0 |
| 4-48 | 57 | 15 | 7 | 0 | 0 | 21 | 0 | 0.1 | 0 | 0 |
| 4-49 | 49 | 15 | 19 | 2 | 0 | 15 | 0 | 0.1 | 0 | 0 |
| 4-50 | 47 | 15 | 21 | 2 | 0 | 15 | 0 | 0.1 | 0 | 0 |
| 4-51 | 45 | 15 | 23 | 2 | 0 | 15 | 0 | 0.1 | 0 | 0 |
| 4-52 | 57 | 16 | 11 | 10 | 0 | 16 | 0 | 0.1 | 0 | 0 |
| 4-53 | 57 | 14.5 | 14 | 0 | 0 | 14.5 | 0 | 0 | 0 | 0 |
| 4-54 | 57 | 15 | 13 | 2 | 0 | 15 | 0 | 0 | 0 | 0 |
| 4-55 | 57 | 14.5 | 14 | 2 | 0 | 14.5 | 0 | 0 | 0 | 0 |
| 4-56 | 57 | 14 | 15 | 2 | 0 | 14 | 0 | 0 | 0 | 0 |
| 4-57 | 57 | 17.5 | 7 | 1 | 0 | 18.5 | 0 | 0.1 | 0 | 0 |
| 4-58 | 57 | 17.5 | 7 | 2 | 0 | 18.5 | 0 | 0.1 | 0 | 0 |
| 4-59 | 57 | 17.5 | 7 | 0 | 0 | 19.5 | 0 | 0.1 | 0 | 0 |
| 4-60 | 57 | 17.5 | 7 | 0 | 0 | 18.5 | 0 | 0.1 | 0 | 3 |
| 4-61 | 57 | 17.5 | 7 | 0 | 0 | 18.5 | 0 | 0.1 | 0 | 6 |
| 4-62 | 53 | 14.5 | 17 | 1 | 0 | 14.5 | 0 | 0.1 | 0 | 0 |
| 4-63 | 51 | 14.75 | 18 | 1.5 | 0 | 14.75 | 0 | 0.1 | 0 | 0 |
| 4-64 | 57 | 18.8 | 5 | 0 | 0 | 18.7 | 0.5 | 0.1 | 0.02 | 0 |
| 4-65 | 57 | 18 | 7 | 10 | 0 | 18 | 0 | 0.1 | 0 | 0 |
| 4-66 | 57 | 17 | 9 | 10 | 0 | 17 | 0 | 0.1 | 0 | 0 |
| 4-67 | 57 | 17.5 | 7 | 4 | 0 | 18.5 | 0 | 0.1 | 0 | 0 |
| 4-68 | 60 | 15.38 | 0 | 0 | 0 | 16.49 | 0 | 0.1 | 0 | 5.15 |

Based on the foregoing, it should be understood that various combinations of glasses from the first, second, third, and fourth composition spaces may be used for the first and second glass compositions forming the laminated glass article.

Another non-limiting example of a first glass composition from which a laminated glass article may be formed is a glass composition which includes the following constituent components: 63.76 mol % SiO$_2$; 9.55 mol % Al$_2$O$_3$; 7.00 mol % B$_2$O$_3$; 2.49 mol % MgO; 7.40 mol % CaO; 3.95 mol % SrO; 5.78 mol % K$_2$O; and 0.07 mol % SnO$_2$. This first glass composition may be paired with a second glass composition which includes, for example, the following constituent components: 64.64 mol % SiO$_2$; 7.38 mol % Al$_2$O$_3$; 16.45 mol % B$_2$O$_3$; 2.21 mol % MgO; 8.14 mol % CaO; 1.11 mol % SrO; and 0.07 mol % SnO$_2$.

Another non-limiting example of a first glass composition from which a laminated glass article may be formed is a glass composition which includes the following constituent components: 49.46 mol % SiO$_2$; 15.22 mol % Al$_2$O$_3$; 19.15 mol % B$_2$O$_3$; 14.83 mol % Na$_2$O; 1.24 mol % K$_2$O; and 0.10 mol % SnO$_2$. This first glass composition may be paired with a second glass composition which includes, for example, the following constituent components: 69.19 mol % SiO$_2$; 8.52 mol % Al$_2$O$_3$; 6.44 mol % MgO; 0.54 mol % CaO; 13.94 mol % Na$_2$O; 1.17 mol % K$_2$O; and 0.19 mol % SnO$_2$.

Yet another non-limiting example of a first glass composition from which a laminated glass article may be formed is a glass composition which includes the following constituent components: 66.72 mol % SiO$_2$; 10.03 mol % Al$_2$O$_3$; 6.00 mol % B$_2$O$_3$; 5.78 mol % K$_2$O; and 0.07 mol % SnO$_2$. This first glass composition may be paired with a second glass composition which includes, for example, the following constituent components: 67.60 mol % SiO$_2$; 10.99 mol % Al$_2$O$_3$; 9.82 mol % B$_2$O$_3$; 2.26 mol % MgO; 8.72 mol % CaO; and 0.19 mol % SnO$_2$.

The techniques for reducing blister defect formation described herein may be used to produce a laminated glass article which is substantially free of blister defects resulting from the lamination process. The phrase "substantially free of blister defects," as used herein, means that the resultant laminated glass article contains less than 1 blister defect per pound of the laminated glass article at the interface between the first glass layer and the second glass layer. In embodiments, the amount of blister defects in the glass article may be less than or equal to about 0.02 blister defects per pound of the laminated glass article at the interface between the first glass layer and the second glass layer or even less than or equal to about 0.002 blister defects per pound of the laminated glass article at the interface between the first glass layer and the second glass layer.

A variety of processes may be used to produce the laminated glass articles described herein including, without limitation, lamination slot draw processes, lamination float processes, or fusion lamination processes. Each of these lamination processes generally involves flowing a first molten glass composition, flowing a second molten glass composition, and contacting the first molten glass composition with the second molten glass composition at a temperature greater than the glass transition temperature of either glass composition to form an interface between the two compositions such that the first and second molten glass compositions fuse together at the interface as the glass cools and solidifies.

Figure 4:
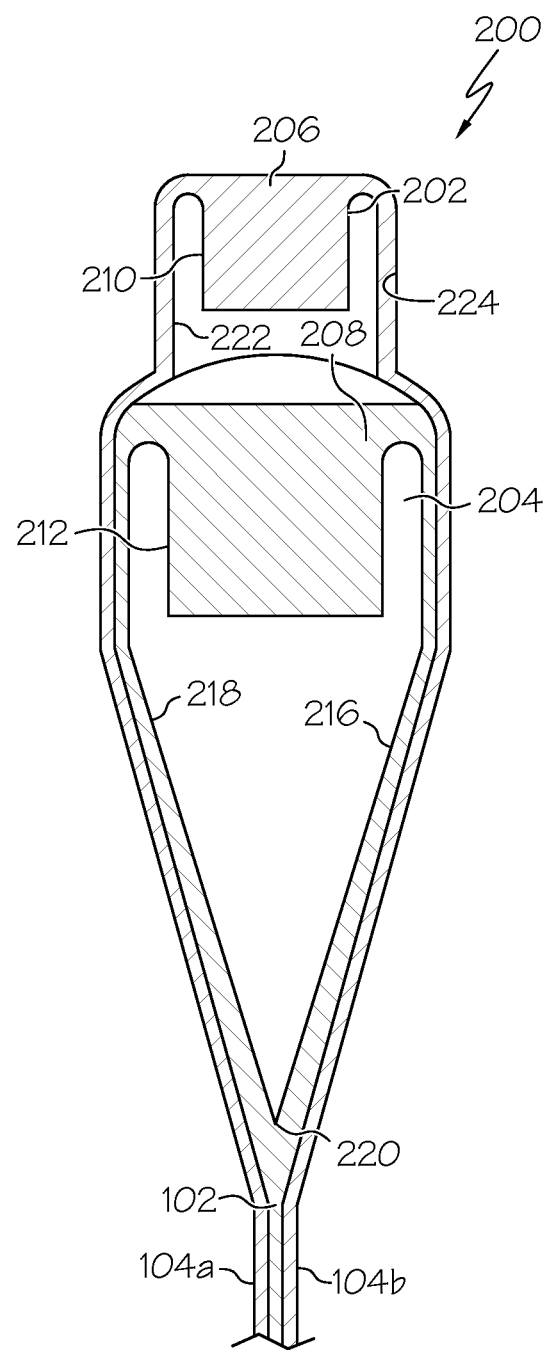
FIG. 4 schematically depicts a fusion draw process for making the glass article of FIG. 3.

In one particular embodiment, the laminated glass articles 100 described herein may be formed by a fusion lamination process such as the process described in U.S. Pat. No. 4,214,886, which is incorporated herein by reference. Referring to FIG. 4 by way of example, a laminate fusion draw apparatus 200 for forming a laminated glass article includes an upper overflow distributor or isopipe 202 which is positioned over a lower overflow distributor or isopipe 204. The upper overflow distributor 202 includes a trough 210 into which a molten glass cladding composition 206 is fed from a melter (not shown). Similarly, the lower overflow distributor 204 includes a trough 212 into which a molten glass core composition 208 is fed from a melter (not shown). In embodiments, the molten glass cladding composition 206 may be the first glass composition and the molten glass core composition may be the second glass composition, each of which has the compositional characteristics as described hereinabove. In other embodiments, the molten glass cladding composition 206 may be the second glass composition and the molten glass core composition may be the first glass composition, each of which has the compositional characteristics as described hereinabove.

As the molten glass core composition 208 fills the trough 212, it overflows the trough 212 and flows over the outer forming surfaces 216, 218 of the lower overflow distributor 204. The outer forming surfaces 216, 218 of the lower overflow distributor 204 converge at a root 220. Accordingly, the molten glass core composition 208 flowing over the outer forming surfaces 216, 218 rejoins at the root 220 of the lower overflow distributor 204 thereby forming a glass core layer 102 of a laminated glass article.

Simultaneously, the molten glass cladding compositions 206 overflows the trough 210 formed in the upper overflow distributor 202 and flows over outer forming surfaces 222, 224 of the upper overflow distributor 202. The molten glass cladding composition 206 is outwardly deflected by the upper overflow distributor 202 such that the molten glass cladding composition 206 flows around the lower overflow distributor 204 and contacts the molten glass core composition 208 flowing over the outer forming surfaces 216, 218 of the lower overflow distributor, fusing to the molten glass core composition and forming glass cladding layers 104a, 104b around the glass core layer 102.

In some embodiments, the molten glass core composition 208 generally has an average core coefficient of thermal expansion $CTE_{core}$ which is greater than the average cladding coefficient of thermal expansion $CTE_{clad}$ of the molten glass cladding composition 206. Accordingly, as the glass core layer 102 and the glass cladding layers 104a, 104b cool, the difference in the coefficients of thermal expansion of the glass core layer 102 and the glass cladding layers 104a, 104b cause a compressive stresses to develop in the glass cladding layers 104a, 104b. The compressive stress increases the strength of the resulting laminated glass article.

While FIG. 4 schematically depicts a particular apparatus for forming planar laminated glass articles such as sheets or ribbons, it should be appreciated that other geometrical configurations are possible. For example, cylindrical laminated glass articles may be formed, for example, using the apparatuses and methods described in U.S. Pat. No. 4,023,953.

EXAMPLES

The embodiments described herein will be further clarified by the following examples.

Example 1

Figure 5:
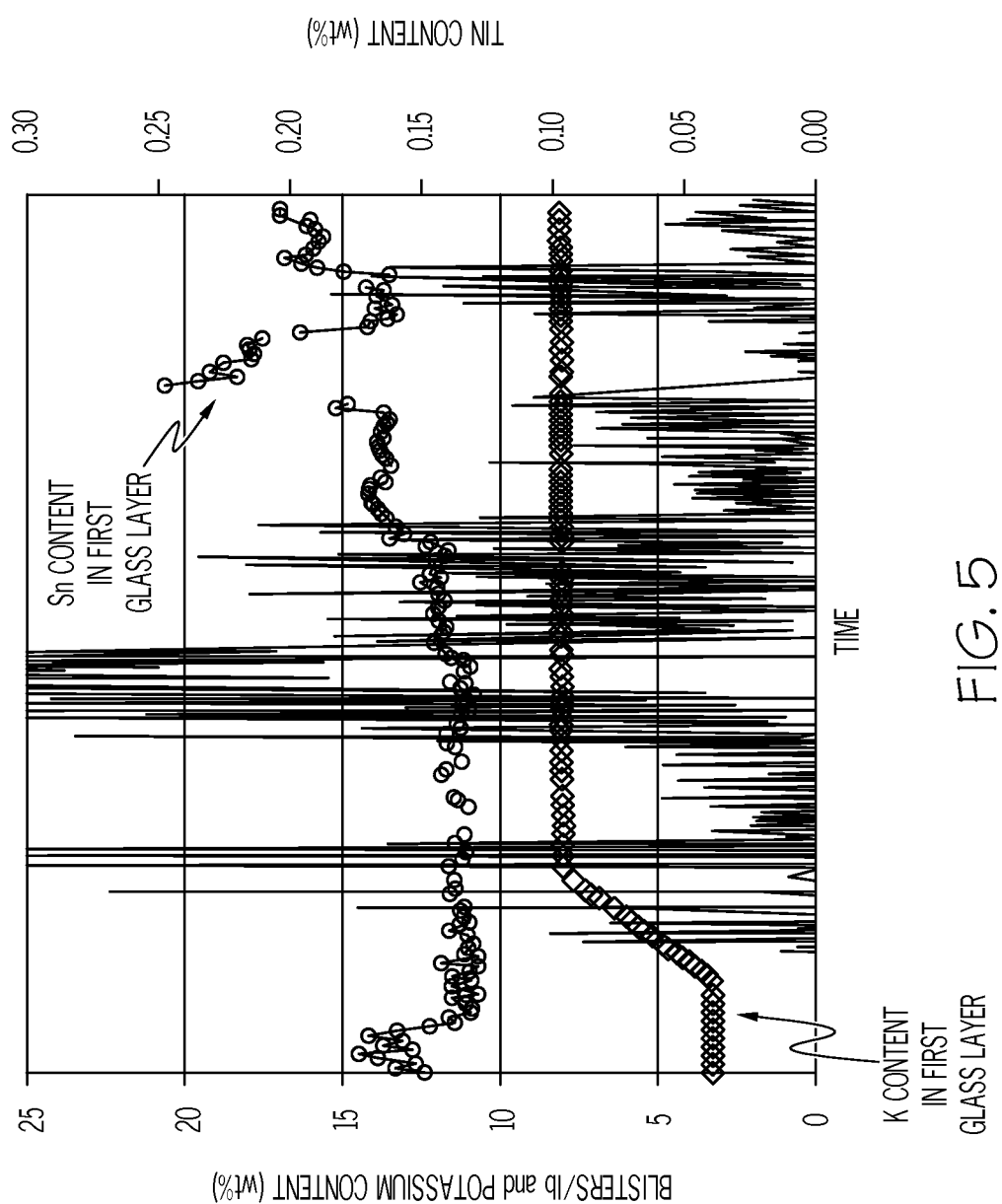
FIG. 5 graphically depicts the effects of increasing the concentration of fining agent in the second glass composition of the laminated glass article on blister defect formation.

The effect of additions of fining agent to the second glass composition of a laminate pair on blister defect formation was investigated. The first glass composition initially included 63.47 mol % $SiO_2$; 9.59 mol % $Al_2O_3$; 7.05 mol % $B_2O_3$; 2.61 mol % MgO; 7.50 mol % CaO; 3.92 mol % SrO; 5.80 mol % $K_2O$; and 0.059 mol % $SnO_2$. The second glass composition initially included 64.68 mol % $SiO_2$; 7.43 mol % $Al_2O_3$; 16.48 mol % $B_2O_3$; 2.18 mol % MgO; 8.08 mol % CaO; 1.10 mol % SrO; and 0.056 mol % $SnO_2$. The first and second glass composition were formed into a tri-layer laminate glass ribbon (as depicted in FIG. 3) using a fusion lamination process. The first glass composition formed the core layer of the laminated glass article and the second glass composition formed the cladding layers of the laminated glass article. Initially, a significant number of blister defects formed in the laminated glass article due to the higher concentration of $K_2O$ in the first glass composition relative to the second glass composition. Initially, additional fining agent was added to the first glass composition but did not result in a reduction of blister defects. However, it was found that additions of fining agent to the second glass composition reduced the blister defect formation. As depicted in FIG. 5, as the concentration of fining agent in the second glass composition was increased from approximately 0.056 mol % to greater than 0.11 mol %, the number of blister defects formed in the first glass composition decreased significantly.

Example 2

A tri-layer laminate glass article, specifically a laminated glass sheet (Sheet A), was formed by fusion lamination from a first glass composition which comprised 63.47 mol % $SiO_2$; 9.59 mol % $Al_2O_3$; 7.05 mol % $B_2O_3$; 2.61 mol % MgO; 7.50 mol % CaO; 3.92 mol % SrO; 5.80 mol % $K_2O$; and 0.059 mol % $SnO_2$ and a second glass composition which comprised 64.68 mol % $SiO_2$; 7.43 mol % $Al_2O_3$; 16.48 mol % $B_2O_3$; 2.18 mol % MgO; 8.08 mol % CaO; 1.10 mol % SrO; and 0.056 mol % $SnO_2$. The first glass composition formed the core layer of Sheet A and the second glass composition formed the cladding layers of Sheet A. Once formed, the number of blister defects in the laminated glass sheet was determined to be approximately 70 blisters/lb of glass.

Thereafter, a second tri-layer laminated glass sheet (Sheet B) was formed using the same first glass composition as Sheet A. The cladding layers of Sheet B were formed from a glass composition similar to that of the second glass composition of Sheet A but with the concentration of $SnO_2$ in the glass increased to 0.061 wt %. Following formation, it was determined that the number of blister defects in Sheet B decreased relative to Sheet A, indicating that increasing the $SnO_2$ concentration in the second glass composition mitigated the formation of blister defects.

A third tri-layer laminated glass sheet (Sheet C) was formed using the same first glass composition as Sheet A. The cladding layers of Sheet C were formed from a glass composition similar to that of the second glass composition of Sheet A but with the concentration of $SnO_2$ in the glass increased to 0.074 mol %. Following formation, it was determined that the number of blister defects in Sheet C further decreased relative to Sheet A and Sheet B, indicating that further increasing the $SnO_2$ concentration in the second glass composition mitigated the formation of blister defects.

A fourth tri-layer laminated glass sheet (Sheet D) was formed using the same second glass composition as Sheet A. However, the core layer of Sheet D was formed from a glass composition similar to that of the first glass composition of Sheet A but with the concentration of $SnO_2$ in the glass sheet increased to 0.07 mol % such that the glass composition included 63.37 mol % $SiO_2$; 9.59 mol % $Al_2O_3$; 7.05 mol % $B_2O_3$; 2.61 mol % MgO; 7.50 mol % CaO; 3.92 mol % SrO; 5.80 mol % $K_2O$; and 0.07 mol % $SnO_2$. Following formation, it was determined that the number of blister defects in Sheet D did not change relative to Sheet A, indicating that further increasing the $SnO_2$ concentration in the first glass composition (i.e., in the core layer) did not mitigate the formation of blister defects.

It should now be understood that the embodiments described herein relate to methods for forming laminated glass articles and, more specifically, to methods for forming laminated glass articles with reduced blister defects. In particular, it has been found that the number of blister defects that occur in a laminated glass article in which a first layer of glass has an excess alkali concentration relative to the second layer of glass to which it is fused can be mitigated by adding excess fining agents to the second layer of glass. The excess fining agent assists in modifying the solubility of oxygen anions in the first layer of glass, thereby mitigating the formation of blister defects. The techniques described herein can be used in conjunction with laminated glass articles formed from a variety of glass compositions and, in particular, with laminated glass articles which are formed from glass compositions which have an excess alkali concentration relative to a second glass composition to which they are fused.

The glass articles described herein can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; for lighting or signage (e.g., static or dynamic signage) applications; or for transportation applications including, for example, rail and aerospace applications.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a laminated glass article, the method comprising:
    flowing a molten first glass composition, the first glass composition comprising a first total $R_2O$ concentration and a first fining agent with a first fining agent concentration, wherein R is an element from Group I of the periodic table;
    flowing a molten second glass composition, the second glass composition comprising a second total $R_2O$ concentration at least 3 mol % less than the first total $R_2O$ concentration of the first glass composition and a second fining agent with a second fining agent concentration that is greater than the first fining agent concentration of the first glass composition;
    contacting the molten first glass composition with the molten second glass composition to form an interface between the molten first glass composition and the molten second glass composition; and
    diffusing R+ ions from the molten first glass composition into the molten second glass composition,
    wherein a core layer of the laminated glass article comprises the second glass composition and a cladding layer of the laminated glass article comprises the first glass composition.

2. The method of claim 1, comprising diffusing multivalent ions of the second fining agent from the molten second glass composition into the molten first glass composition, and chemically dissolving uncompensated oxygen anions in the molten first glass composition.

3. The method of claim 1, wherein the first fining agent and the second fining agent each comprise at least one of oxides of Mn, oxides of Ce, oxides of As, oxides of Sb, oxides of Fe, and oxides of Sn.

4. The method of claim 1, wherein the first fining agent and the second fining agent comprise oxides of Sn.

5. The method of claim 4, wherein a ratio of $Sn^{+2}$ ions to a total concentration of Sn in the molten first glass composition is greater than or equal to about 0.2.

6. The method of claim 4, wherein a ratio of $Sn^{+2}$ ions to a total concentration of Sn in the molten first glass composition is greater than or equal to about 0.3.

7. The method of claim 1, wherein R is at least one of Li, K, and Na.

8. The method of claim 1, wherein the core layer has an average core coefficient of thermal expansion that is greater than an average cladding coefficient of thermal expansion of the cladding layer.

9. A method for forming a laminated glass article, the method comprising:
    flowing a molten first glass composition, the first glass composition comprising a first total $R_2O$ concentration and $SnO_2$ at a first $SnO_2$ concentration, wherein R comprises at least one of K, Na, and Li;
    flowing a molten second glass composition, the second glass composition comprising a second total $R_2O$ concentration at least 3 mol % less than the first total $R_2O$ concentration of the first glass composition and $SnO_2$ at a second $SnO_2$ concentration greater than the first $SnO_2$ concentration of the first glass composition; and
    contacting the molten first glass composition with the molten second glass composition to form an interface between the molten first glass composition and the molten second glass composition, wherein R+ ions from the molten first glass composition diffuse into the molten second glass composition and $Sn^{+2}$ ions from the molten second glass composition diffuse into the molten first glass composition, chemically dissolving uncompensated oxygen anions in the molten first glass composition,
    wherein a core layer of the laminated glass article comprises the second glass composition and a cladding layer of the laminated glass article comprises the first glass composition, and
    wherein the core layer has an average core coefficient of thermal expansion which is greater than an average cladding coefficient of thermal expansion of the cladding layer.

10. The method of claim 9, wherein a ratio of $Sn^{+2}$ ions to a total concentration of Sn in the molten first glass composition is greater than or equal to about 0.2.

11. The method of claim 9, wherein a ratio of $Sn^{+2}$ ions to a total concentration of Sn in the molten first glass composition is greater than or equal to about 0.3.

* * * * *